United States Patent

Bobrowski et al.

Patent Number: 5,203,919
Date of Patent: Apr. 20, 1993

[54] METHOD AND COMPOSITIONS FOR STABILIZING CONCRETE RESIDUES

[75] Inventors: Gregory S. Bobrowski, Chagrin Falls; Robert J. Ryan, Maple Heights, both of Ohio

[73] Assignee: Sandoz Ltd., Basel, Switzerland

[21] Appl. No.: 861,152

[22] Filed: Mar. 27, 1992

Related U.S. Application Data

[63] Continuation of Ser. No. 507,704, Apr. 10, 1990, abandoned, which is a continuation of Ser. No. 408,638, Sep. 18, 1989, abandoned, which is a continuation of Ser. No. 144,886, Jan. 14, 1988, abandoned.

[51] Int. Cl.$^5$ ..................... C04B 16/00; C04B 24/00
[52] U.S. Cl. ..................... 106/802; 106/804; 106/806; 106/808; 106/809; 106/823; 106/725; 106/727
[58] Field of Search ............... 106/708, 725, 727, 729, 106/802, 804, 806, 808, 809, 823

[56] References Cited

U.S. PATENT DOCUMENTS

| | | | |
|---|---|---|---|
| 3,215,548 | 11/1965 | Vollick | 106/90 |
| 3,346,487 | 10/1967 | Irani et al. | 106/803 |
| 3,346,488 | 10/1967 | Irani et al. | 106/806 |
| 3,619,221 | 3/1969 | Kossivas | 106/727 |
| 3,624,018 | 3/1970 | Eilers | 524/377 |
| 3,794,506 | 2/1974 | Schmidt et al. | 106/717 |
| 3,839,260 | 10/1974 | Eilers et al. | 523/130 |
| 3,839,262 | 10/1974 | Eilers et al. | 524/234 |
| 3,839,263 | 10/1974 | Eilers et al. | 523/130 |
| 3,885,985 | 5/1975 | Serafin et al. | 106/820 |
| 3,941,772 | 3/1976 | Ploger et al. | 106/781 |
| 3,973,978 | 8/1976 | Nakagawa et al. | 106/694 |
| 4,190,454 | 2/1980 | Yamagisi et al. | 106/695 |
| 4,264,368 | 4/1981 | Schutz | 106/728 |
| 4,286,992 | 9/1981 | Galer et al. | 106/696 |
| 4,401,473 | 8/1983 | Kleiner et al. | 106/781 |
| 4,455,171 | 6/1984 | Spensley et al. | 106/694 |
| 4,461,644 | 7/1984 | Childs et al. | 106/606 |
| 4,466,834 | 8/1984 | Dodson et al. | 106/728 |
| 4,466,835 | 8/1984 | Crump et al. | 106/717 |
| 4,466,836 | 8/1984 | Crump et al. | 106/717 |
| 4,468,252 | 8/1984 | Crump et al. | 106/717 |
| 4,472,200 | 9/1984 | Crump et al. | 106/717 |
| 4,494,990 | 1/1975 | Harris | 106/732 |
| 4,500,356 | 2/1985 | Crump et al. | 106/717 |
| 4,655,838 | 4/1987 | Koga et al. | 524/5 |
| 4,661,161 | 4/1987 | Jackacki et al. | 106/648 |
| 4,676,832 | 6/1987 | Childs et al. | 106/730 |
| 4,680,396 | 7/1987 | Crump et al. | 544/337 |
| 4,683,003 | 7/1987 | Nakano et al. | 106/677 |
| 4,700,780 | 10/1987 | Brothers | 106/811 |
| 4,964,917 | 10/1990 | Bobrowski et al. | 106/804 |

FOREIGN PATENT DOCUMENTS

| | | |
|---|---|---|
| 886330 | 5/1981 | Belgium . |
| 166798 | 3/1984 | European Pat. Off. . |
| 2937835 | 2/1971 | Fed. Rep. of Germany . |
| 2057918 | 7/1970 | France . |
| 2513623 | 8/1981 | France . |
| 2474479 | 3/1990 | France . |
| 8100195 | 1/1991 | France . |
| 7954587 | 5/1979 | Japan . |
| 94179611 | 5/1979 | Japan . |
| 59-162009 | 7/1984 | Japan . |
| 59-156950 | 9/1984 | Japan . |
| 59-206895 | 10/1984 | Japan . |
| 10283476 | 11/1984 | Japan . |
| 10511015 | 2/1986 | Japan . |
| 7849473 | 8/1988 | Japan . |
| 726307 | 4/1980 | U.S.S.R. . |
| 985257 | 1/1983 | U.S.S.R. . |
| 1051229 | 10/1983 | U.S.S.R. . |
| 1325543 | 8/1969 | United Kingdom . |
| 1538103 | 9/1976 | United Kingdom . |
| 1538102 | 1/1979 | United Kingdom . |
| 2168695 | 9/1985 | United Kingdom . |
| 2194528 | 3/1988 | United Kingdom . |

OTHER PUBLICATIONS

Nature, pp. 32-33, Jul. 6, 1963.

(List continued on next page.)

Primary Examiner—Karl Group
Assistant Examiner—Anthony J. Green
Attorney, Agent, or Firm—Gerald D. Sharkin; Richard E. Vila; Walter F. Jewell

[57] ABSTRACT

Method and compositions for the stabilization (prevention of hardening) of concrete residues in Ready-Mix truck drums.

17 Claims, No Drawings

OTHER PUBLICATIONS

Concrete-Making Materials, Contents, pp. 133-141. No date available.
Australian Bldg. Research Congress, Sessions 1B-3B, 1964.
Functions & Eval. of Conc. Admixtures, pp. 1-5. No date available.
Constructional Review, pp. 16-21, Feb., 1964.
Encyclopedia of Chem. Techn., p. 167, vol. 6. No date available.
Construction Review, pp. 46-49, May 1985.
Australian Standards 1478 and 1479, pp. 21-25, 1973.
The Mortard Advantage, User's Guide Grace Construction Co. No date available.
Master Builders, Elmax Tech. Bulletin, no date available.
Concrete, pp. 166-169 and 187-190, no date available.
NRMCA, pp. 3-11, Sep., 1972.
Concrete Products, pp. 28-29, Dec.-1983.
Betonwerk+Fertigteil-Technik, pp. 830-836, Heft, Dec. 1984.
ACI Journal, pp. 281-287, Jul.-1977.
NRMCA, pp. 1-14, Jun. 9, 1971.
NRMCA, pp. 1-15, Dec. 1964.
Concrete Construction, pp. 604+Jul. 1982, 54+Sep. 1975.
ENR News, McGraw-Hill Construction Weekly, pp. 8, 9, and 68, May 5, 1988.
New Civil Engineer, p. 6, May 26, 1988.
Concrete Products, pp. 30-34, Mar.-1988.
Concrete, pp. 20-21 and 44, Mar.-1988.
Concrete Construction, pp. 299-305, Mar.-1986.
Concrete Products, pp. 22-23, Jun. 1985.
Practical Quality Control for Concrete, pp. 139-141, no date available.
Concrete Admixtures Handbook, pp. 54-55, 116-127, 211-217, no date avail.
Beton, pp. 321-324, Sep., 1983.
Monsanto, Dequest 2000,2006,2010,2016,2041,2047,2051,2054,2060 and 2066, no date available.
Abstract, FR 2513-523, Technique Beton SA, 1983.
Betonwerk, pp. 571-580, Aug.-1972.

METHOD AND COMPOSITIONS FOR STABILIZING CONCRETE RESIDUES

This is a continuation of application Ser. No. 07/507,704, filed Apr. 10, 1990, now abandoned, which is a continuation of application Ser. No. 07/408,638, filed Sep. 19, 1989, now abandoned, which is a continuation of application Ser. No. 07/144,886, filed Jan. 4, 1988, now abandoned.

This invention relates to concrete stabilization. More particularly, it relates to the stabilization of concrete residues in Ready-Mix trucks.

BACKGROUND OF THE INVENTION

It is the present practice in the Ready-Mix concrete industry to wash-out any concrete residue left in a Ready-Mix truck at the end of the day, to prevent the concrete residue from hardening in the truck drum. This practice is time consumming and requires slurry pits to retain the spent concrete. Furthermore, it results in high hauling costs to dispose of the spent concrete. This procedure is both economically and environmentally undesirable.

There is need for method and compositions to eliminate the present wasteful wash-out procedure.

THE INVENTION

Broadly, this invention stabilizes the concrete residues in a Ready-Mix truck by the addition of a stabilizing composition to the clean-up slurry water in the truck drum. Stabilization of the slurry-water prevents it from hardening in the truck drum.

The stabilizing method of this invention comprises the steps of:

1) Adding the required amount of water to a Ready-Mix truck drum to form a slurry with the concrete residue. The truck should be empty of returned concrete, except for the concrete residue.
2) Adding a stabilizer, which is a chelating agent for calcium, e.g., [nitrilotris(methylene]tris, phosphonic acid to the slurry water and mixing the drum contents.

DESCRIPTION OF PREFERRED EMBODIMENTS

The preferred stabilizers are phosphonic acid derivatives, more preferably those containing hydroxy and amino groups, which are capable of acting as calcium chelating agents. Particularly preferred stabilizers of this type are compounds of DEQUEST (R.T.M.) series, sold by Monsanto Co. (St. Louis, Mo.), in particular:

DEQUEST 2000 Phosphonic acid, [nitrilotris (methylene)]tris.

DEQUEST 2006 Phosphonic acid, [nitrilotris (methylene)]tris-, pentasodium salt.

DEQUEST 2010 Phosphonic acid, (1,hydroxyethylidene) bis.

DEQUEST 2016 Phosphonic acid, (1,hydroxyethylidene) bis-, tetrasodium salt.

DEQUEST 2041 Phosphonic acid, [1,2-ethanediylbis [nitrilobis (methylene)]]tetrakis.

DEQUEST 2047 Phosphonic acid, [1,2-ethanediylbis [nitrilobis (methylene)]]tetrakis-, calcium sodium salt (2:5:6).

DEQUEST 2051 Phosphonic acid, [1,6-hexanediylbis [nitrilobis (methylene)]]tetrakis.

DEQUEST 2054 Phosphonic acid, [1,6-hexanediylbis [nitrilobis (methylene)]]tetrakis-, potassium salt.

DEQUEST 2060 Phosphonic acid, [[bis[2-bis (phosphonomethyl) amino]ethyl]amino]methyl].

DEQUEST 2066 Phosphonic acid, [[(phosphonomethyl) imino]bis[(2,1-ethanediylnitrilo) tetrakis (methylene)]]tetrakis-, sodium salt.

Other suitable stabilizers include hydroxycarboxylic acids and their salts, including citric, gluconic, tartaric, fumaric, itaconic, malonic and glucoheptanoic acids; polycarboxylic acids and their salts, e.g., polymaleic, polyfumaric, polyacrylic and polymethacrylic acids, preferably of low molecular weight; antioxidants e.g., ascorbic acid, isoascorbic acid; polymers e.g., sulphonic acid - acrylic acid copolymers, polyhydroxysilanes and polyacrylamide, preferably of low molecular weight; carbohydrates, e.g., sucrose and corn syrup; and lignosulphonates, e.g., calcium lignosulphonates. Of these, the hydroxycarboxylic acids, polycarboxylic acids, ascorbic acid, isoascorbic acid, carbohydrates and polyhydroxysilanes are preferred. The preferred hydroxycarboxylic acids are gluconic acid and glucoheptanic acid.

More preferred stabilizers are mixtures of at least one retarder of the phosphonic acid type with at least one stabilizers of a different type. As many of the non-phosphonic acid stabilizers e.g., citric acid also have water-reducing properties, these may also have the effect of increasing the compressive strength of the final set concrete.

Particularly prefered stabilizers are mixtures of the DEQUEST series with citric acid, particularly Dequest 2000/citric acid. Preferred ratios of Dequest to citric acid are from 1:1 to 2:1.

A preferred stabilizing formulation (S) of this invention is:

0.008 lbs per fl. oz. of phosphonic acid, [nitrilotris(methylene)]tris-Dequest 2000
0.005 lbs. per fl. oz. of citric acid which may be added for example as 40 fl. oz. of solution to 60 gallons of slurry-water.

EXAMPLE 1

In a preferred method of operating the process of the invention, when a Ready-Mix truck returns to a mixing plant empty of any returned concrete, the required amount of water is added to the concrete residue in the truck drum. The concrete residue slurry-water is backed up to the rear of the drum and the required amount of stabilizer composition is added to the slurry. The stabilized slurry-water is returned to the front of the drum, and the drum is run at high speed for one minute.

The stabilized slurry-water is again backed up to the rear of the drum for additional drum-fin cleaning. The stabilized slurry-water is again returned to the front of the drum, and the drum run at high speed for an additional one minute.

The following day, or after a weekend, freshly batched concrete is added to the drum and mixed normally. The amount of water used to batch the fresh concrete is reduced by the amount of water used to make the slurry-water.

The following are various stabilizing compositions (S) of this invention in fluid ounces (fl. oz.) or liters of solution, per gallons of water, or liters of water. The compositions are based on the length of time of stabilization of the water slurry desired e.g., overnight (about 18-24 hours), or over a weekend (about 48-72 hours). The stabilizer composition(s) dosage may vary depending on user requirements and/or field conditions.

Overnight stabilizer treatment dosage:
32-64 fl. oz. or 1-2 liters per truck.
Weekend stabilizer treatment dosage:
64-96 fl. oz. or 2-3 liters per truck.
Water addition:
25-160 gallons or 94-605 liters per truck.

EXAMPLE 2

To determine the effect of the stabilizer compositions of this invention on the compressive strength of concrete the following study was run.

A Ready-Mix truck was emptied of concrete and 100 liters of water plus 1 liter of stabilizer composition (S) was added to the truck drum to form a slurry. The stabilized slurry-water was treated as described in Example 1.

The stabilized slurry-water was maintained overnight in the truck drum.

The next day 10.5 $m^3$ of concrete was added to the drum and mixed with the stabilized slurry-water in the drum. The concrete cement factor was;

```
200 Kg/m³ Type I cement and
 40 Kg/m³ fly ash.
Compressive Strength data on the concrete was;
 6 day Compressive Strength    14.0 MPa    2030 PSI
 6 day Compressive Strength    13.2 MPa    1914 PSI
 6 day Compressive AV          13.6 MPa    1972 PSI
28 day Compressive Strength    21.4 MPa    3103 PSI
28 day Compressive Strength    22.2 MPa    3219 PSI
28 day Compressive AV          21.8 MPa    3161 PSI
```

Reference Compressive Strength for concrete not treated by the invention process was;

```
 7 day Compressive Strength    2175 PSI
28 day Compressive Strength    3190 PSI.
```

These reference strengths are based on the prior 3-month compressive strength averages.

This study shows that the stabilizing compositions of this invention have no adverse effect on the compressive strength of treated concrete.

EXAMPLE 3

A 2 cu. ft. mixer was filled with 0.7 cu. ft. of concrete and thoroughly mixed. The concrete was emptied from the mixer and 0.5 gal. of water and 0.96 fl. oz. of stabilizer composition (S) was added to the concrete residue in the mixer. The resultant slurry was mixed in a manner analogous to Example 1. The stabilized slurry-water was allowed to sit overnight.

The next day 0.7 cu. ft. of concrete was added to the stabilized slurry-water and thoroughly mixed.

Compressive Strength data on the concrete is as follows:

| Trial | Formula | Slump | Air | Initial Set | W/C | PSI Percent 1 Day | 7 Day | 28 Day |
|---|---|---|---|---|---|---|---|---|
| 0 | Plain | 4.50 | 1.1 | 5.125 | .567 | 1087 100 | 3687 100 | 6403 100 |
| 1 | Stabilized | 4.50 | 1.2 | 5.250 | .569 | 1171 108 | 3837 104 | 6615 103 |

| Trial | Formula | Slump | Air | Initial Set | W/C | PSI Percent 1 Day | 7 Day | 28 Day |
|---|---|---|---|---|---|---|---|---|
| | Slurry | | | | | | | |

Slump — The drop in inches of a 12 inch cone. ASTM C-143
Air — The percentage of entrained air
PSI/Percent — Pounds per square inch of compressive strength of a concrete sample (4" × 4" cube) The percent is the percent of increase or decrease of breaking strength based on the plain mix at 100%.
W/C — Water to cement ratio.

The results show no adverse effect of the compositions of this invention on the compressive strength of the resulting concrete mixes.

A number of beneficial effects may be attributed to the stabilizing compositions of this invention.

1. Eliminates the need for washing out concrete residue from a Ready-Mix truck drum.
2. Eliminates the need for slurry pits.
3. Reduces the time normally taken for truck drum washout.
4. Keeps truck drums cleaner by preventing concrete residue build-up.
5. Compressive strengths of the resultant concrete will be equal to or greater than freshly batched concrete.
6. Conserves water.
7. Has a major impact on solving the environmental issues raised by slurry pits and sludge disposal.

What is claimed is:

1. A method for stabilizing concrete residue in a ready-mix truck drum consisting essentially of the steps of:
   1) adding water to the ready-mix truck drum to form a slurry with the concrete residue therein;
   2) adding from 32 to 96 fluid ounces of a stabilizing agent to stabilize the concrete slurry for a period of time; the stabilizing agent being selected from the group consisting of a phosphonic acid derivative; a hydroxycarboxylic acid or salt thereof; a polycarboxylic acid or salt thereof; ascorbic acid, isoascorbic acid; a sulphonic acid-acrylic acid copolymer; a polyhydroxysilane; a polyacrylamide; a carbohydrate; a lignosulfonate; and mixtures thereof;
   3) mixing the stabilizing agent and drum contents to form a stabilized concrete slurry; and
   4) thereafter adding fresh concrete to the stabilized concrete slurry.

2. The method according to claim 1 wherein the stabilizing agent comprises at least one phosphonic acid derivative.

3. The method according to claim 1 wherein the phosphonic acid derivative is selected from the group consisting of
   Phosphonic acid, [nitrilotris (methylene)]tris;
   Phosphonic acid, [nitrilotris (methylene)]tris-, pentasodium salt;
   Phosphonic acid, (1,hydroxyethylidene) bis;
   Phosphonic acid, (1,hydroxyethylidene) bis-, tetrasodium salt;
   Phosphonic acid, [1,2-ethanediylbis[nitrilobis (methylene)]]tetrakis;
   Phosphonic acid, [1,2-ethanediylbis[nitrilobis (methylene)]]tetrakis-, calcium sodium salt (2:5:6);
   Phosphonic acid, [1,6-hexanediylbis [nitrilobis (methyl)]]tetrakis;

Phosphonic acid, [1,6-hexanediylbis [nitrilobis (methylene)]]tetrakis-, potassium salt;

Phosphonic acid, [[bis[2-bis (phosphonomethyl) amino]ethyl]amino]methyl]; and

Phosphonic acid, [[(phosphonomethyl) imino]bis [(2,1-ethanedylnitrilo) tetrakis (methylene)]]tetrakis-, sodium salt.

4. The method according to claim 1 wherein the phosphonic acid derivative is phosphonic acid, [nitrilotris (methylene)]tris.

5. The method according to claim 1 wherein the stabilizer comprises at least one compound selected from hydroxycarboxylic, polycarboxylic acids and their salts; ascorbic, isoascorbic acids; sulphonic acid - acrylic acid copolymers; polyhydroxysilanes; polyacrylamide; carbohydrates and lignosulphonates.

6. The method according to claim 1 wherein the stabilizer comprises at least one compound selected from hydroxycarboxylic acids and their salts, polycarboxylic acids and their salts, ascorbic acid, isoascorbic acid, corn syrup and polyhydroxysilanes.

7. The method according to claim 1 wherein the stabilizing agent comprises a mixture of:
   (a) at least one compound selected from a phosphonic acid derivative and,
   (b) at least one compound selected from the group consisting of hydroxycarboxylic, polycarboxylic acids and their salts; ascorbic, isoascorbic, acids; sulphonic acid - acrylic acid copolymers; polyhydroxysilanes; polyacrylamide; carbohydrates; and lignosulfonates.

8. The method according to claim 7 wherein the stabilizing agent comprises a mixture of:
   (a) at least one of phosphonic acid, [nitrolotris(methylene)]tris;
   phosphonic acid, [nitrilotris (methylene)]tris-, pentasodium salt;
   Phosphonic acid, (1,hydroxyethylidene) bis;
   Phosphonic acid, (1,hydroxyethylidene) bis-, tetrasodium salt;
   Phosphonic acid, [1,2-ethanediylbis[nitrilobis (methylene)]]tetrakis;
   Phosphonic acid, [1,2-ethanediylbis[nitrilobis (methylene)]]tetrakis-, calcium sodium salt (2:5:6);
   Phosphonic acid, [1,6-hexanediylbis [nitrilobis (methylene)]]tetrakis;
   Phosphonic acid, [1,6-hexanediylbis [nitrilobis (methylene)]]tetrakis-, potassium salt;
   Phosphonic acid, [[bis[2-bis(phosphonomethyl)amino]ethyl]amino]methyl]; and
   Phosphonic acid, [[(phosphonomethyl)imino]bis [2,1-ethanedylnitrilo)tetrakis(methylene)]]tetrakis-, sodium salt; and
   (b) Citric Acid.

9. Method according to claim 8 in which the stabilizer consists of phosphonic acid, [nitrilotris (methylene)]tris and citric acid.

10. A method according to claim 8, in which the ratio of phosphonic acid[nitrilotris (methylene)]tris to citric acid is from 1:1 to 2:1.

11. The method according to claim 10 further comprising corn syrup as an additional stabilizer.

12. The method according to claim 6 wherein the hydroxycarboxylic acid is gluconic acid or glucoheptanic acid.

13. The method according to claim 1 wherein the carbohydrate stabilizing agent is corn syrup.

14. The method according to claim 1 wherein the hydroxycarbonylic acid stabilizing agent is gluconic acid or glucoheptanic acid or salt thereof.

15. The method according to claim 1 in which the fresh concrete is added to the stabilized concrete slurry from about 18 to 24 hours after the addition of the stabilizing agent.

16. The method according to claim 1 in which from 25 to 160 gallons of water are added to the truck drum to form the concrete slurry.

17. The method according to claim 1 in which the stabilizing agent is selected from the group consisting of at least one hydroxycarboxylic acid or salt thereof.

* * * * *